(12) United States Patent
Nagashima et al.

(10) Patent No.: US 9,334,057 B2
(45) Date of Patent: May 10, 2016

(54) ANTI-ICING SYSTEM AND AIRCRAFT

(71) Applicant: MITSUBISHI AIRCRAFT CORPORATION, Aichi (JP)

(72) Inventors: Yoshihiro Nagashima, Aichi (JP);
Noriyuki Enguchi, Aichi (JP);
Shinichiro Asami, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/471,004

(22) Filed: Aug. 28, 2014

(65) Prior Publication Data

US 2015/0073655 A1   Mar. 12, 2015

(30) Foreign Application Priority Data

Sep. 11, 2013   (JP) .................................. 2013-188505

(51) Int. Cl.
*B64D 15/20* (2006.01)
*B64D 45/00* (2006.01)

(52) U.S. Cl.
CPC ................ *B64D 15/20* (2013.01); *B64D 45/00* (2013.01)

(58) Field of Classification Search
CPC ............................... B64D 15/20; B64D 45/00
USPC .......................................................... 701/36
See application file for complete search history.

(56) References Cited

U.S. PATENT DOCUMENTS

| | | | | |
|---|---|---|---|---|
| 3,917,193 A * | 11/1975 | Runnels, Jr. | .................. | 244/207 |
| 4,741,499 A * | 5/1988 | Rudolph et al. | .......... | 244/134 B |
| 5,114,100 A * | 5/1992 | Rudolph et al. | .......... | 244/134 C |
| 6,194,685 B1 * | 2/2001 | Rutherford | .................. | 219/201 |
| 6,467,730 B2 * | 10/2002 | Laugt | ........................ | 244/134 B |
| 7,157,663 B1 * | 1/2007 | Kismarton | .................. | 219/201 |
| 7,784,739 B2 * | 8/2010 | Nichols | ...................... | 244/134 F |
| 8,061,657 B2 * | 11/2011 | Rocklin et al. | ............ | 244/134 B |
| 8,444,093 B1 * | 5/2013 | Epstein | ...................... | 244/134 B |
| 2004/0107027 A1 * | 6/2004 | Boudrieau | ........................ | 701/1 |
| 2005/0012642 A1 * | 1/2005 | Sacle | ............................. | 340/973 |
| 2008/0218385 A1 * | 9/2008 | Cook et al. | ..................... | 340/962 |
| 2011/0226904 A1 * | 9/2011 | Flemming | .................. | 244/134 F |
| 2014/0253348 A1 * | 9/2014 | Maeda et al. | ................. | 340/966 |

FOREIGN PATENT DOCUMENTS

JP   2011-183922 A   9/2011

* cited by examiner

*Primary Examiner* — Muhammad Shafi
*Assistant Examiner* — Majdi Alsomiri
(74) *Attorney, Agent, or Firm* — Pearne & Gordon LLP

(57) ABSTRACT

Provide is an anti-icing system that can cause anti-icing devices to properly operate even if a breakdown occurs in a switch after a pilot sets the switch.

An anti-icing system of the present invention that controls operations of anti-icing devices provided in an aircraft includes: operation mode selecting means that selects an operation mode of the anti-icing devices; and control means that controls the operations of the anti-icing devices according to the operation mode selected by the operation mode selecting means. The operation mode includes at least a manual mode, an automatic mode, and a stop mode, and the control means controls the operations of the anti-icing devices in the automatic mode if detecting that a breakdown occurs in the operation mode selecting means when the manual mode or the stop mode is selected by the operation mode selecting means.

6 Claims, 4 Drawing Sheets

US 9,334,057 B2

ANTI-ICING SYSTEM AND AIRCRAFT

BACKGROUND OF THE INVENTION

1. Field of the Invention

The present invention relates to a system suitable for preventing icing on particular parts of an aircraft in flight.

2. Description of the Related Art

Icing occurs when an aircraft flies in an area where supercooled water droplets exist. In particular, if icing occurs on leading edges of wings or air intakes of engines and adhered ice grows, a lift of the aircraft may be reduced. Then, the flight becomes unstable.

Thus, aircraft include anti-icing devices, as one of safety devices, for preventing icing that occurs according to flight environments around the aircraft.

As anti-icing devices, for example, Japanese Patent Laid-Open No. 2011-183922 discloses a device for preventing the leading edges of wings from icing by using high-temperature bleed air discharged from engines.

The anti-icing devices operate under an operation mode that a pilot selects according to a flight environment from among a manual mode, a stop mode, and an automatic mode.

In order to secure safety of flight of an aircraft, it is desired to make an appropriate selection from among the above three operation modes.

Thus, an object of the present invention is, on the basis of the above demand, to provide an anti-icing system that can switch to an appropriate operation mode.

SUMMARY OF THE INVENTION

The anti-icing system of the present invention, which is devised to achieve the above object, is an anti-icing system that controls the operations of anti-icing devices provided in an aircraft, and that includes operation mode selecting means that selects an operation mode of the anti-icing devices, and control means that controls the operations of the anti-icing devices according to the operation mode selected by the operation mode selecting means, the operation mode includes at least a manual mode, an automatic mode, and a stop mode, and the control means controls the operations of the anti-icing devices by the automatic mode if the occurrence of a breakdown is detected in the operation mode selecting means when the manual mode or the stop mode is selected by the operation mode selecting means.

According to the anti-icing system of the present invention, it is possible to reliably control the operations of the anti-icing devices on the basis of icing detection signals from icing detectors, even if a switch breaks down while the manual mode or the stop mode is selected as the operation mode of the anti-icing devices. It is, therefore, possible to further enhance the safety relating to the fuselage anti-icing function of the aircraft in an emergency.

In addition, the anti-icing system of the present invention includes an altimeter for measuring flight altitude of an aircraft, and control means can control the operations of anti-icing devices by the automatic mode on the basis of flight altitude information obtained from the altimeter after the aircraft reaches a predetermined flight altitude.

According to the anti-icing system of the present invention, it is possible to fly while allowing the anti-icing devices to operate in the operation mode for which a pilot's intention has priority, until the aircraft reaches the predetermined flight altitude.

Furthermore, the anti-icing system of the present invention preferably has a displaying part for displaying the operation mode of anti-icing devices.

In addition, the present invention also provides an aircraft equipped with the above anti-icing system.

According to the present invention, it is possible to reliably control the anti-icing devices of an aircraft by selecting an appropriate operation mode taking a flight environment or a pilot's intention into consideration.

DETAILED DESCRIPTION OF THE PREFERRED EMBODIMENTS

The embodiments according to the present invention will be described below in detail with reference to the drawings.

The embodiments to be described below include two forms of procedure for controlling the operations of anti-icing devices 50 with which an aircraft 1 is equipped, however, the basic configuration as an anti-icing system 10 is common to the two forms. Thus, the configuration of the anti-icing system 10 will be firstly described, and thereafter the two forms about the control procedures for the anti-icing devices 50 will be described in order.

[Configuration of Anti-Icing System]

Figure 1:
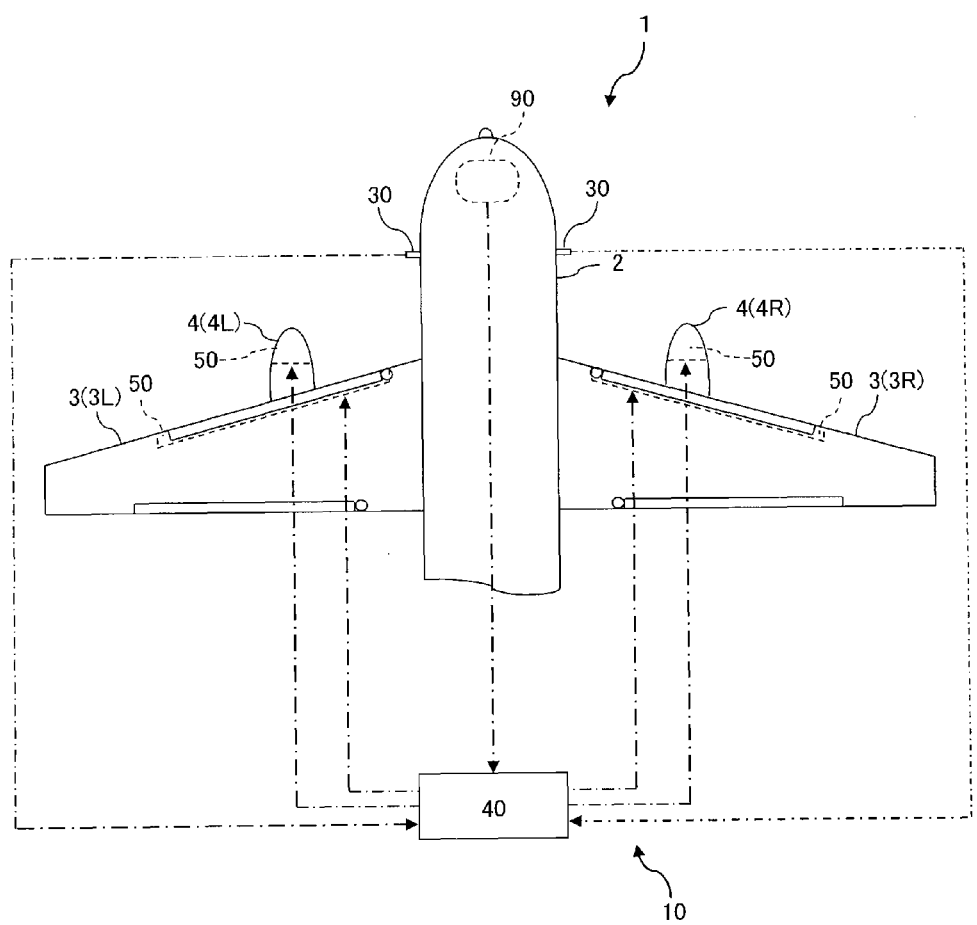
FIG. 1 is a diagram showing an aircraft including an anti-icing system according to embodiments of the present invention.
Figure 2:
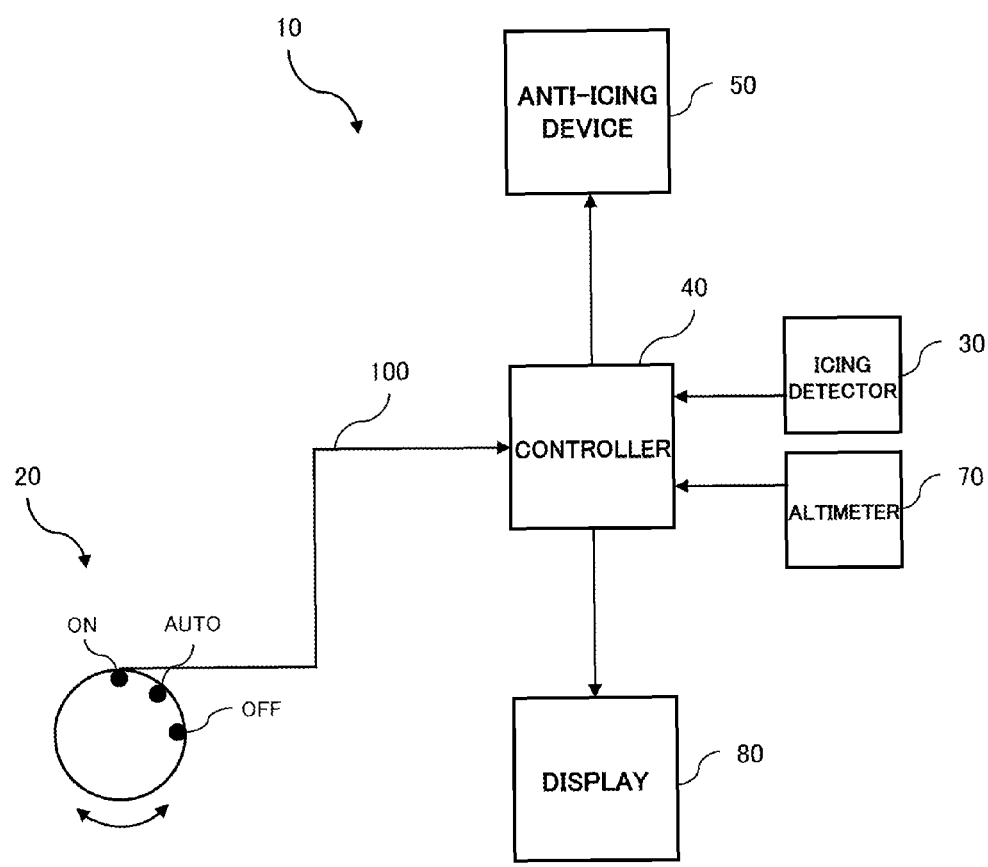
FIG. 2 is a block diagram showing a configuration of the anti-icing system.

An anti-icing system 10 of an aircraft 1 shown in FIG. 1 and FIG. 2 controls the operations of the anti-icing devices 50 under instructions from a pilot.

The anti-icing system 10 prevents anti-icing objects from icing, for example, the leading edges or the air intakes of engines 4 (4R and 4L) of main wings 3 (3R and 3L) of the aircraft 1 shown in FIG. 1.

The anti-icing system 10 includes, as shown in FIG. 2, a switch 20, icing detectors 30, a controller 40, the anti-icing devices 50, an altimeter 70, and a display 80.

The controller 40 controls the operations of the anti-icing devices 50 according to an operation mode that is selected by the switch 20. For example, the controller 40 controls the operations of the anti-icing devices 50 by referring to signals that are obtained from the icing detectors 30. Alternatively, the controller 40 controls the operations of the anti-icing devices 50 by referring to signals that are obtained from the altimeter 70 provided in the aircraft 1.

The switch 20 is configured to be able to select any one of three operation modes including a manual mode (hereafter, may be also referred to as ON mode), an automatic mode (hereafter, may be also referred to as AUTO mode), and a stop mode (hereafter, may be also referred to as OFF mode).

The ON mode is a mode that operates the anti-icing devices 50 continuously while the mode is selected by way of the switch 20 under the control by the pilot. The AUTO mode is a mode that operates or stops the anti-icing devices 50 on the basis of detection results from the icing detectors 30. The OFF mode is a mode that stops the operations of the anti-icing devices 50 when the mode is selected. That is, when the selection is switched to the OFF mode while the ON mode or the AUTO mode is selected, the operations of the anti-icing devices 50 are stopped.

The pilot selects an operation mode of the anti-icing devices 50, which the pilot desires, from among the three modes by handling the switch 20. A signal corresponding to the operation mode selected by the switch 20 (hereafter, may be also referred to as a mode signal) is transmitted to the controller 40. As the switch 20, for example, a dial switch is used in which the ON mode, AUTO mode, and OFF mode can be selected in accordance with a rotation position.

The icing detectors 30 are devices for detecting the occurrence of icing on themselves. The icing detectors 30 transmit signals identifying the presence/absence of icing on themselves (hereafter, may be also referred to as an icing detection signal) to the controller 40. These signals are used for determining whether to operate the anti-icing devices 50 in the AUTO mode.

The icing detectors 30 are provided on right and left sides of a fuselage 2 of the aircraft 1, one by one and independently detect icing. Thus, detection results are also independently transmitted to the controller 40.

Various detectors can be applied to the icing detectors 30. For example, an icing detector that operates on the basis of fluctuations of a natural frequency thereof due to the presence/absence of icing, an icing detector that operates on the basis of fluctuations of a capacitance between electrodes thereof due to the presence/absence of icing, and other known detectors can be used therefor.

The controller 40 transmits an instruction to the anti-icing devices 50 on the basis of the mode signal corresponding to the operation mode selected by the switch 20, as will be described below.

Upon obtaining a signal corresponding to the ON mode (hereafter, may be also referred to as an ON mode signal), the controller 40 transmits a signal to instruct the anti-icing devices 50 to operate (hereafter, may be also referred to as an ON instruction signal) irrespective of icing detection signals from the icing detectors 30.

In addition, upon obtaining a signal corresponding to the AUTO mode (hereafter, may be also referred to as an AUTO mode signal), the controller 40 determines whether to operate the anti-icing devices 50, on the basis of the icing detection signals from the icing detectors 30. That is, upon obtaining the icing detection signals indicating that icing occurs, the controller 40 transmits the ON instruction signal to instruct the anti-icing devices 50 to operate. In contrast, upon obtaining the icing detection signal indicating that icing does not occur, the controller 40 transmits a signal to instruct the anti-icing devices 50 to stop the operations (hereafter, may be also referred to as an OFF instruction signal). That is, when the anti-icing devices 50 operate, the operation is stopped. Alternatively, when the anti-icing devices 50 are at a standstill, the standstill is continued as it is.

In addition, upon obtaining a signal corresponding to the OFF mode (hereafter, may be referred to as an OFF mode signal), the controller 40 transmits the OFF instruction signal to instruct the anti-icing devices 50 to stop the operations irrespective of icing detection signals from icing detectors 30.

In addition, the controller 40 obtains information on the flight altitude of the aircraft 1 from the altimeter 70. The flight altitude information is provided to a pilot by being displayed on the display 80 connected to the controller 40 and used for controlling the operations of the anti-icing devices 50 in a second embodiment. The controller 40 causes the display 80 to display the operation mode selected by a pilot, that is, the ON mode, the AUTO mode, or the OFF mode. The display 80 is provided in a cockpit 90 of the aircraft 1.

The anti-icing devices 50 are devices for preventing anti-icing objects from icing, and are provided in the main wings 3 and the engines 4. The anti-icing devices 50 operate according to an instruction signal corresponding to each operation mode transmitted from the controller 40, that is, the ON instruction signal or the OFF instruction signal.

The anti-icing devices 50 have any configurations as long as they can achieve the purposes thereof, and for example, a device for preventing anti-icing objects from icing by making use of bleed air of the engines can be applied.

[Operation of Anti-Icing System 10]

The operation of the anti-icing system 10 having the above configuration will be described.

A pilot handles the switch 20 to select the ON mode when determining that the operations of the anti-icing devices 50 are needed on the basis of information about the humidity, temperature, and the like outside the aircraft. Then, the controller 40 that obtains the ON mode signal transmits the ON instruction signal to the anti-icing devices 50.

When determining that there is no need to operate the anti-icing devices 50, the pilot handles the switch 20 to select the OFF mode. Then, the controller 40 that obtains the OFF mode signal transmits the OFF instruction signal to the anti-icing devices 50.

Alternatively, when the pilot intends to allow the anti-icing system 10 to determine whether or not to operate the anti-icing devices 50, the pilot handles the switch 20 to select the AUTO mode. Then, the controller 40 that obtains the AUTO mode signal refers to icing detection signals from the icing detectors 30 and transmits the ON instruction signal or the OFF instruction signal to the anti-icing devices 50.

Note that the operation mode selected by the pilot is displayed on the display 80.

First Embodiment

First, a first embodiment relating to a control procedure of anti-icing devices 50 will be described with reference to FIG. 3. The first embodiment can cause the anti-icing devices 50 to properly operate taking a case into consideration where, for example, the signal system of a switch 20 breaks after a pilot once sets the operation mode of the anti-icing devices 50 prior to takeoff.

Note that a breakdown in the switch 20 means that a mode signal corresponding to the operation mode selected by the pilot using the switch 20 is not properly transmitted to a controller 40. Here, the presence/absence of the breakdown in the switch 20 is determined, for example, by the controller 40 comparing information on the contact of the switch 20 obtained through a data bus 100 (FIG. 2) with normal information on the contact held by the controller 40.

Therefore, for example, if the switch 20 breaks when the OFF mode is selected, correct information on the contact is not transmitted to the controller 40 through the data bus 100, and it is thus not possible to cause the anti-icing devices 50 to operate since the mode signal is not properly transmitted although the pilot determines and intends to switch to the ON mode.

Figure 3:
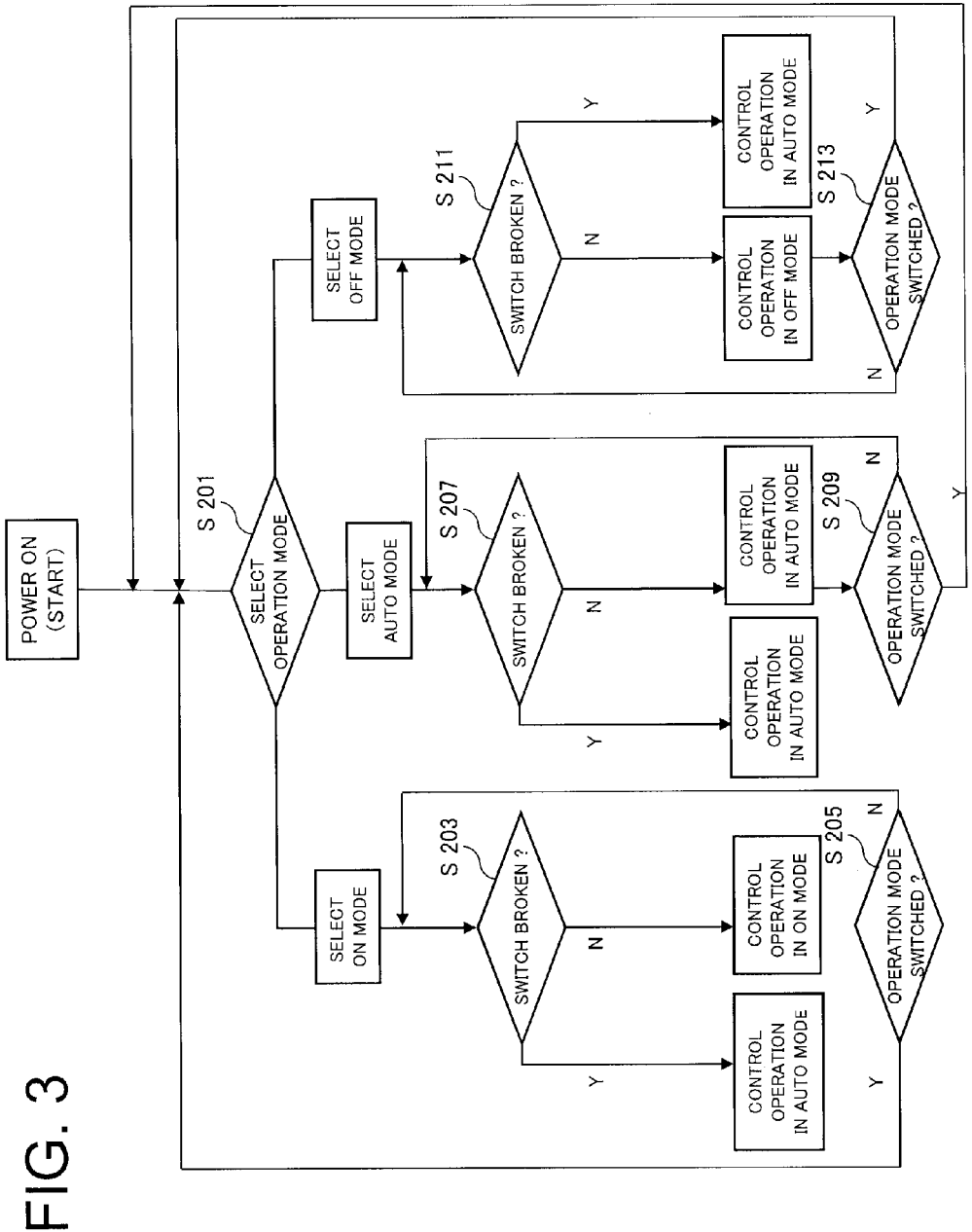
FIG. 3 is a flow chart showing a control procedure of the anti-icing system in a first embodiment.

As shown in FIG. 3, the pilot selects an operation mode from any one of the ON mode, the OFF mode, and the AUTO mode, by way of the switch 20 (S201). In addition, the controller 40 determines whether or not a breakdown has occurred in the switch 20 (S203, S207, and S211).

[ON Mode]

First, a control procedure when a pilot selects the ON mode will be described.

When a pilot selects the ON mode, the controller 40 performs a control such that the anti-icing devices 50 operate in the ON mode unless a breakdown is detected in the switch 20, the signal system thereof, or the like (S203 N). That is, the controller 40 transmits the ON instruction signal to instruct the anti-icing devices 50 to operate, on the basis of the ON mode signal obtained from the switch 20. Then, the controller 40 maintains the ON mode while checking the presence/absence of a breakdown unless the pilot switches the operation mode by handling the switch (S205 N). In addition, when the pilot handles the switch 20 to switch the operation mode (S205 Y), the controller 40 performs a control procedure in the selected operation mode (OFF mode or AUTO mode) (to be described hereafter).

In contrast, if detecting a breakdown in the switch (S203 Y), the controller 40 switches the operation mode of the anti-icing devices 50 from the ON mode to the AUTO mode, and performs a control procedure in the AUTO mode. In this case, on a display 80, the operation mode (AUTO mode) to which the controller 40 switches is displayed rather than the operation mode (ON mode) selected by the pilot.

[AUTO Mode]

Next, a control procedure when the AUTO mode is selected will be described.

When a pilot selects the AUTO mode, the controller 40 performs a control such that the anti-icing devices 50 operate in the AUTO mode unless a breakdown is detected in the switch 20, the signal system thereof, or the like (S207 N). That is, the controller 40 transmits the ON instruction signal or OFF instruction signal to the anti-icing devices 50 to control the operations thereof, referring to icing detection signals obtained from icing detectors 30. Then, the controller 40 maintains the AUTO mode while checking the presence/absence of a breakdown unless the pilot switches the operation mode by handling the switch (S209 N). In addition, when the pilot handles the switch 20 to switch the operation mode (S209 Y), the controller 40 performs a control procedure in the selected operation mode (ON mode or OFF mode).

In addition, if detecting a breakdown in the switch 20, the controller 40 controls the operations of the anti-icing devices 50 in the AUTO mode (S207 Y).

[OFF Mode]

Next, a control procedure when the OFF mode is selected will be described.

When the pilot selects the OFF mode, the controller 40 performs a control such that the anti-icing devices 50 operate in the OFF mode unless a breakdown is detected in the switch 20, the signal system thereof, or the like (S211 N). That is, the controller 40 transmits the OFF instruction signal to instruct the anti-icing devices 50 to stop the operations, on the basis of the OFF mode signal obtained from the switch 20.

Then, the controller 40 maintains the OFF mode while checking the presence/absence of a breakdown unless the pilot switches the operation mode by handling the switch (S213 N). In addition, when the pilot handles the switch 20 to switch the operation mode (S213 Y), the controller 40 performs a control procedure in the selected operation mode (ON mode or AUTO mode).

In contrast, if detecting a breakdown in the switch (S211 Y), the controller 40 switches the operation mode of the anti-icing devices 50 from the OFF mode to the AUTO mode, and performs a control procedure in the AUTO mode. In this case, on the display 80, the operation mode (AUTO mode) to which the controller 40 switches is displayed rather than the operation mode (OFF mode) selected by the pilot.

The above-described anti-icing system 10 of the first embodiment has a feature in that the operation mode is switched to the AUTO mode if a breakdown is detected in the switch 20 while in particular the ON mode or OFF mode is selected as the operation mode of the anti-icing devices 50. With this feature, it is possible to reliably control the operations of the anti-icing devices 50 on the basis of the icing detection signals from the icing detectors 30, the reliability of which is relatively increased in response to the breakdown in the switch 20, and it is thus possible to further enhance the safety relating to the fuselage anti-icing function of the aircraft in emergency.

Note that, there is an alternative that the anti-icing devices 50 continue to operate in the ON mode as it is if having been operating in the ON mode. However, in the case of this alternative, the anti-icing devices 50 may be caused to function even when not needed. For example, if anti-icing is to be performed by using high-temperature bleed air from engines, there are increased occasions in which anti-icing objects are exposed to high temperature, and this is not preferable from a viewpoint of thermal fatigue of the anti-icing objects. Hence, in the present embodiment, the operation mode is switched to the AUTO mode even when the anti-icing devices 50 operate in the ON mode.

Second Embodiment

Figure 4:
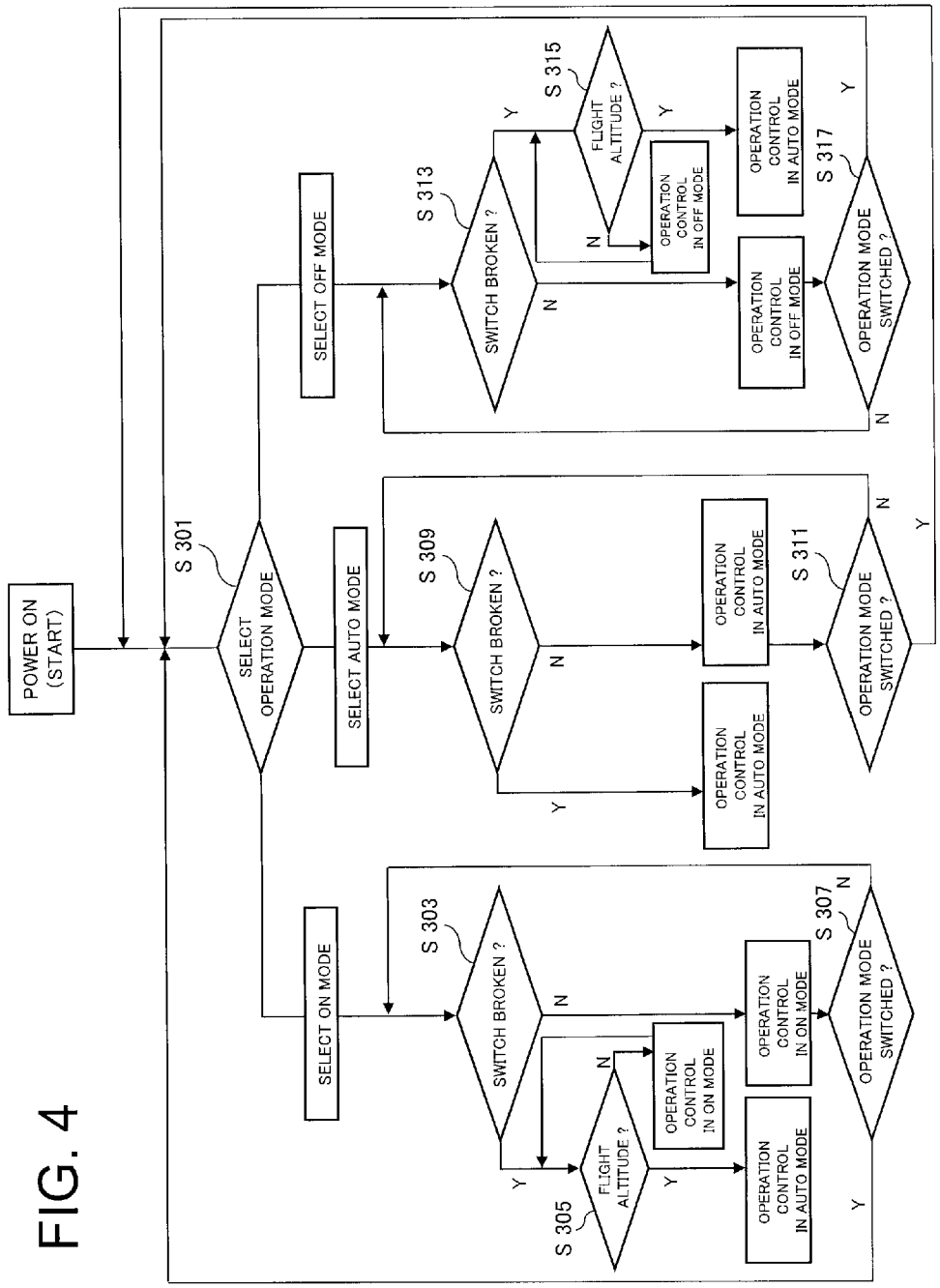
FIG. 4 is a flow chart showing the control procedure of the anti-icing system in a second embodiment.

Next, a second embodiment relating to a control procedure of anti-icing devices 50 will be described with reference to FIG. 4.

In the second embodiment, when the ON mode or the OFF mode is selected as the operation mode of the anti-icing devices 50, the ON mode or the OFF mode is maintained without being switched to the AUTO mode even when a breakdown occurs in a switch 20, until a predetermined flight condition is satisfied. Apart from this regard, the second embodiment includes a control procedure similar to that of the first embodiment, and thus the following description will be made focusing on the difference from the first embodiment. A case where a pilot selects the ON mode or OFF mode prior to the takeoff of an aircraft 1, will be described below.

[ON Mode]

In the case where the pilot selects the ON mode prior to a takeoff, the operation mode of the anti-icing devices 50 is not immediately switched from the ON mode to the AUTO mode even if a controller 40 detects a breakdown in the switch 20 (S303 Y). On the basis of flight altitude information obtained from an altimeter 70, the controller 40 determines whether or not the aircraft 1 satisfies a predetermined altitude condition (S305).

When the flight altitude of the aircraft 1 does not satisfy the predetermined altitude condition, the operation mode of the anti-icing devices 50 is maintained at the ON mode selected by the pilot prior to the takeoff, and the ON mode is displayed on a display 80 (S305 N). However, when the flight altitude satisfies the predetermined altitude condition, the controller 40 switches the operation mode of the anti-icing devices 50 from the ON mode to the AUTO mode, and the AUTO mode is displayed on the display 80 (S305 Y).

Here, the reason for specifying the flight altitude as the condition for switching the operation mode is that, within a range where the flight altitude is low, an environment where icing occurs to the aircraft 1 is considered to be equivalent to an environment prior to takeoff. Note that it is desirable to set, for example, an altitude range from 0 to 400 feet as a predetermined altitude condition. The reason for this is that there is a small difference between an icing condition within this altitude range and that at the ground (prior to takeoff), and that the pilot is under relatively heavy loads of controlling within this altitude range.

Note that, although the controller 40 determines the condition of the flight altitude after detecting a breakdown, this order is not meant to limit the present invention.

[OFF Mode]

In addition, also in the case where the pilot selects the OFF mode prior to takeoff, the controller 40 operates as with the ON mode.

That is, even if the controller 40 detects a breakdown in the switch 20 (S313 Y), the operation mode of the anti-icing devices 50 is not immediately switched from the OFF mode to the AUTO mode. On the basis of the flight altitude information obtained from the altimeter 70, the controller 40 determines whether or not the aircraft 1 satisfies a predetermined altitude condition (S315).

Then, when the flight altitude of the aircraft 1 does not satisfy the predetermined altitude condition, the operation mode of the anti-icing devices 50 is maintained to the OFF mode selected by the pilot prior to takeoff, and the OFF mode is displayed on the display 80 (S315 N). However, when the flight altitude satisfies the predetermined altitude condition, the controller 40 switches the operation mode of the anti-icing devices 50 from the OFF mode to the AUTO mode, and the AUTO mode is displayed on the display 80 (S315 Y).

The above switching operation in the ON mode and OFF mode can be performed using a latch circuit.

Note that, when the AUTO mode is selected prior to takeoff, the controller 40 controls the operations of the anti-icing devices 50 as with the first embodiment.

According to the second embodiment, even if a breakdown is detected in the switch 20 after the pilot sets the operation mode at the ON mode or OFF mode prior to takeoff, the operation mode of the anti-icing devices 50 is maintained at the ON mode or OFF mode selected prior to takeoff without being switched to the AUTO mode until the flight altitude reaches a certain altitude after the takeoff. That is, the second embodiment can further enhance safety relating to anti-icing because the intention that the pilot had prior to takeoff can be maintained until the flight altitude reaches the certain altitude. In addition, it is possible to secure the stability of fuselage control even at a take-off altitude at which a flight environment is unstable as compared with in cruising.

Furthermore, since an operation mode same as that set by the pilot prior to takeoff is displayed on the display 80 until the flight altitude reaches the certain altitude, the pilot can perform the control with security without feeling a sense of incongruity.

There are described above the embodiments of the present invention, and the configuration described in the above-described embodiments may be chosen or changed to other configurations as appropriate without departing from the gist of the present invention.

For example, with respect to the predetermined flight condition in the second embodiment, a flight time after takeoff may be employed as the predetermined flight condition instead of the flight altitude. Alternatively, a flight speed may be employed as the predetermined flight condition.

In addition, the second embodiment describes the example in which the ON mode or OFF mode is selected prior to takeoff, and can be applied to any timing during the flight of the aircraft 1.

What is claimed is:

1. An anti-icing system that controls an operation of an anti-icing device provided in an aircraft, the anti-icing system comprising:

operation mode selecting means that selects an operation mode of the anti-icing device; and control means that controls the operation of the anti-icing device according to the operation mode selected by the operation mode selecting means, wherein:

the operation mode includes at least a manual mode, an automatic mode, and a stop mode;

when the control means detects that a breakdown occurs in the operation mode selecting means when the manual mode is selected by the operation mode selecting means, the control means controls the operation of the anti-icing device in the automatic mode; and when the control means detects that a breakdown occurs in the operation mode selecting means when the stop mode is selected by the operation mode selecting means, the control means controls the operation of the anti-icing device in the automatic mode.

2. The anti-icing system according to claim 1, further comprising:

an altimeter that measures a flight altitude of the aircraft, wherein on the basis of flight altitude information obtained from the altimeter, the control means controls the operation of the anti-icing device in the automatic mode when the aircraft reaches a predetermined flight altitude.

3. The anti-icing system according to claim 2, further comprising a displaying part that displays the operation mode of the anti-icing device.

4. The anti-icing system according to claim 1, further comprising a displaying part that displays the operation mode of the anti-icing device.

5. The anti-icing system according to claim 1, further comprising an icing detector that detects icing on the aircraft, wherein the control means instructs the anti-icing device to stop operations in the stop mode irrespective of an icing detection signal from the icing detector.

6. An aircraft comprising an anti-icing system that controls an operation of an anti-icing device provided in an aircraft, the anti-icing system comprising:

operation mode selecting means that selects an operation mode of the anti-icing device; and control means that controls the operation of the anti-icing device according to the operation mode selected by the operation mode selecting means, wherein:

the operation mode includes at least a manual mode, an automatic mode, and a stop mode;

if the control means detects that a breakdown occurs in the operation mode selecting means when the manual mode is selected by the operation mode selecting means, the control means controls the operation of the anti-icing device in the automatic mode; and if the control means detects that a breakdown occurs in the operation mode selecting means when the stop mode is selected by the operation mode selecting means, the control means controls the operation of the anti-icing device in the automatic mode.

* * * * *

UNITED STATES PATENT AND TRADEMARK OFFICE
CERTIFICATE OF CORRECTION

PATENT NO.        : 9,334,057 B2
APPLICATION NO.   : 14/471004
DATED             : May 10, 2016
INVENTOR(S)       : Yoshihiro Nagashima et al.

Page 1 of 1

It is certified that error appears in the above-identified patent and that said Letters Patent is hereby corrected as shown below:

In the specification,

Column 5, line 19, please add -- 20 -- between "switch" and "(S203"

Column 5, line 63, please add -- 20 -- between "switch" and "(S211"

Signed and Sealed this
Second Day of August, 2016

Michelle K. Lee
*Director of the United States Patent and Trademark Office*